United States Patent Office 3,106,462
Patented Oct. 8, 1963

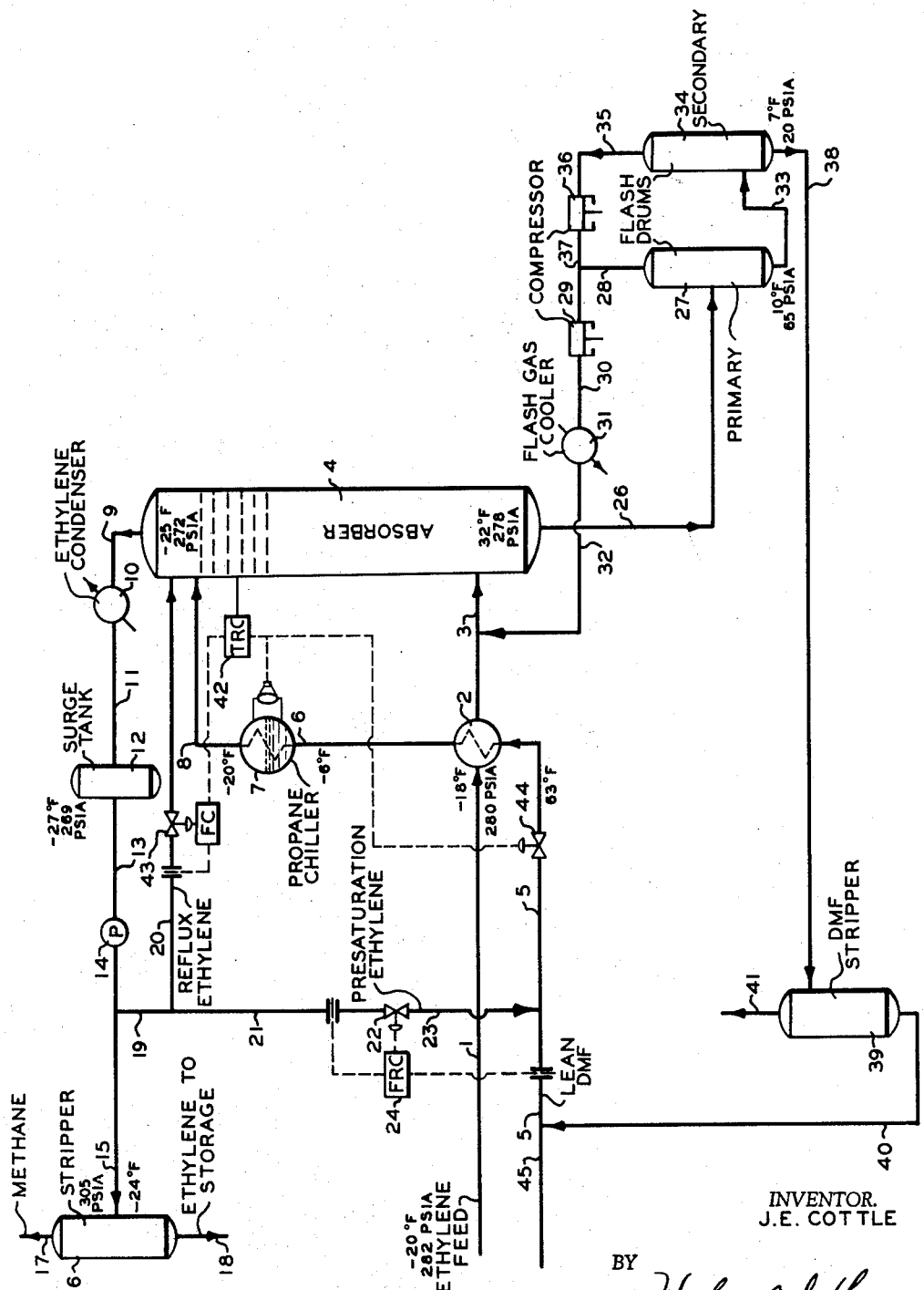

3,106,462
PURIFICATION OF GASES BY ABSORPTION
John E. Cottle, Bartlesville, Okla., assignor to Phillips Petroleum Company, a corporation of Delaware
Filed Sept. 12, 1958, Ser. No. 760,749
8 Claims. (Cl. 55—20)

This invention relates to the purification of gas. In one of its aspects, it relates to the control of the reflux fed to an absorber responsive to change in the level of a so-called temperature break in the gradient of the temperature in said absorber. In another of its aspects, the invention involves regulating the temperature of the solvent fed to the absorber responsive to change in the level of said temperature break. In a further aspect of the invention, it relates to regulating the amount of solvent fed to said absorber responsive to change in the level of said temperature break.

In a further aspect still, the invention relates to an apparatus comprising means for sensing the change in the level of the temperature break in an absorber and means operatively connected with said first means for controlling at least one of the purified gas reflux to said absorption tower, the temperature of the solvent fed to said absorber, and the amount of the solvent fed to said absorber.

It has now been found in connection with the removal of acetylene from ethylene employing dimethylformamide (DMF) as a solvent that refrigeration requirements can be efficiently and readily kept at a minimum in method and means which are self-compensating for change in feed composition, feed temperature, flow rate, etc., by detecting a temperature break in an absorber in which the ethylene is being purified at or near a point at which little or no further acetylene is being absorbed by the solvent and regulating one of the operating variables in the method which can control the absorbing operation to effectively purify the ethylene. Indeed, it appears that the operation can be effected by regulating one of the variables above noted in the manner set forth and described herein or in an equivalent manner. Further, it is clear that the modus operandi herein set forth is applicable to the purification of gas to remove a contaminant component therefrom, the gas being other than ethylene and/or acetylene, also other solvents can be used.

The operation very advantageously eliminates the tedious analysis ordinarily required to check the purity of the purified ethylene or other gas, providing an excellent judge for the column or absorber performance.

It is an object of this invention to provide method and apparatus for the purification of a gas.

It is a further object of this invention to provide for the purification of ethylene by the removal of acetylene therefrom employing a solvent selective for acetylene in the presence of ethylene.

It is a further object of this invention to provide self-compensating method and means for the purification of gases in an absorption zone or absorber thus eliminating tedious analysis which ordinarily must be repetitively performed in order to judge absorber or column performance.

Other aspects, objects, and the several advantages of this invention are apparent from a study of the disclosure, the drawing, and the appended claims.

According to this invention there is provided a method for the purification of gas which comprises passing lean solvent and gas to be purified into countercurrent flow relationship in an absorption zone, removing from said zone a purified gas stream and rich solvent containing a contaminant, returning to said zone as reflux therefor purified gas and regulating one of the amount of reflux, the temperature of the solvent, and the amount of solvent passed to said absorption zone responsive to the level of the break point in the temperature gradient in said zone.

Also according to this invention there is provided an apparatus for the purification of gas by absorption which comprises, in combination, an absorber, outlet means at the top of said absorber for removing purified gas therefrom, outlet means at the bottom of said absorber for removing contaminant rich solvent therefrom, inlet means for feeding solvent to the top of said absorber, inlet means for feeding purified gas as reflux to the top of said absorber and means for sensing change in the temperature at a mid-point of said absorber and means operatively connected with said means for sensing the temperature and said inlet means for feeding reflux to control the amount of reflux fed to said absorber.

Also, according to this invention, the temperature sensing means is operatively connected to control the temperature and/or the rate of feed of the solvent to the absorber.

To more fully set forth and more fully describe the invention to one skilled in the art reading this disclosure, it is noted that the so-called break point in the temperature gradient in the tower occurs because there is a level at which, in the tower under acceptable operating conditions, little or no further absorption is taking place and, therefore, little or no heat evolution is taking place. Thus, it will be understood by one skilled in the art in possession of this disclosure that the now preferred operation according to the invention involves the addition of purified gas to the solvent to presaturate the same to obtain a more sharply defined break in the column. Thus, in the case of ethylene for example, the amount of presaturation ethylene can be, and in this embodiment is, assured by placing the ethylene flow to the DMF on a ratio flow controller. Thus, as the DMF travels downwardly in countercurrent flow with the rising ethylene which contains acetylene, there will be a sudden rise in temperature when the DMF encounters the ethylene containing substantial concentrations of acetylene and the rate of absorption thereof by the acetylene-lean DMF increases sharply.

By use of the temperature recorder controller or an equivalent device in the method and apparatus of this invention, change in the level of the temperature break in the temperature gradient in the tower will be sensed and required compensating action taken as described herein.

The net result of operation according to this invention is not to control the composition of a mixture of gases leaving the top of a tower but rather to control the level of a definite break point in the temperature gradient in the column or absorber thus ensuring that at all times the gas leaving the top of the tower is pure gas or contaminant-free.

The drawing illustrates diagrammatically embodiments according to the invention in which a temperature recorder controller senses the temperature in the column just above the normal break point and controls at least one of reflux ethylene to the tower, the liquid level in the propane chiller which chills the DMF, and the rate of feed of DMF to the column. It will be understood by those skilled in the art in possession of this disclosure that the drawing has been made omitting various pumps, valves, pipes, controllers, and other pieces of equipment as well as operational steps not required to set forth the invention in a manner required by the statutes and rules and by the practice thereunder. Thus, the drawing is a showing of the invention from which certain components, which would be present in the execution of the invention, have been omitted for the sake of simplicity.

Referring now to the drawing, ethylene fed from an ethylene fractionator, largely in vapor form, is passed by way of pipe 1 into heat exchanger 2 wherein it is heat exchanged with lean DMF and by way of pipe 3 into absorber 4. DMF is fed by way of pipe 5, heat exchanger 2, pipe 6, propane chiller 7, and pipe 8 into the top of absorber 4. DMF passes downwardly in countercurrent liquid-vapor contact with the ethylene feed from which acetylene is to be selectively absorbed according to the invention. As the lean DMF passes downwardly in the tower, at a certain tray therein, it will encounter rising ethylene containing some unabsorbed acetylene. This results in a detectable temperature increase or break point in the temperature gradient in the absorber. Purified ethylene is taken overhead by way of pipe 9, passed through ethylene condenser 10 and by way of pipe 11 to surge tank 12. From the surge tank, purified ethylene is taken overhead by way of pipe 13, pump 14, and pipe 15 to methane stripper 16 wherein it is stripped of methane, taken overhead by way of pipe 17. Stripper bottoms are removed from the stripper by way of pipe 18 and sent to storage. Reflux ethylene is passed by way of pipes 19 and 20 to the top of absorber 4 as indicated. Pre-saturation ethylene is passed by way of pipe 21, flow control valve 22, and pipe 23 to DMF feed pipe 5. Flow ratio controller 24 maintains a constant predetermined ratio of presaturation ethylene in the lean DMF. Bottoms from absorber 4 are passed by way of pipe 26 to DMF flash drum 27 wherein ethylene is flashed from the rich DMF taken overhead by way of pipe 28, compressed by compressor 29 and passed by way of pipe 30, flash gas controller 31, and pipe 32 to pipe 3 and thence to absorber 4. Flash drum bottoms are removed by way of pipe 33 and passed to secondary flash drum 34. Additional ethylene which is recovered is taken overhead by way of pipe 35 and pumped by pump 36 and pipe 37 into the suction of pump 29 for return to absorber 4 together with the primary flash drum overhead. Bottoms are removed from the secondary flash drum 34 by way of pipe 38 and passed to DMF treatment which essentially comprises a stripper 39. Lean DMF is removed from the bottom of stripper 39 and passed by way of pipe 40 to pipe 5 for reuse. Overhead from stripper 39 is taken off by way of pipe 41. Make-up DMF is added by way of pipe 45. The overhead in pipe 41 contains the removed acetylene and a minor proportion of ethylene.

According to the invention temperature recorder controller 42 is operatively connected to propane chiller 7 and controls the level of liquid propane therein. Thus, when there is an undesired rise in the level of the break point in absorber 4 an increased amount of propane is caused by instrument 42 to be evaporated, reducing the temperature of the DMF fed to the absorber. Also according to the invention, instrument 42 is operatively connected to valve 43 and can be used to adjust the quantity of reflux ethylene fed to the top of the absorber. Instrument 42 is also connected to valve 44 and thus controls the rate of circulation of lean DMF to tower 4.

Ordinarily, instrument 42 is used to control only one of the level in the propane chiller, reflux ethylene and lean DMF circulation rate. It is, however, within the scope of the invention to use various combinations of these three controls, if desired.

Although the invention has been described with respect to the DMF purification of ethylene to remove acetylene therefrom the invention can be applied to other gas purification operations.

This invention is applicable to the absorption of butane and heavier from natural or casing head gas using, for example, mineral seal oil absorbent presaturated with propane. It can also be applied with advantage to the absorption of a high purity propylene from a $C_3$ hydrocarbon stream using, say, dimethylformamide as solvent, this solvent being presaturated with propane.

The following table gives additional data to that shown on the drawing.

*Table I*

| | Fresh Ethylene Feed | Total Absorber Feed | DMF to Absorber | Absorber Overhead | Pure Ethylene | Reflux Ethylene | Absorber Bottoms | Primary Flash Gas | Flash Gas | Primary Flash Bottoms | Secondary Flash Gas | Sec. Flash Bottoms | DMF Stripper Bottoms | DMF Stripper Overhead |
|---|---|---|---|---|---|---|---|---|---|---|---|---|---|---|
| Stream No. | 1 | 3 | 8 | 9 | 18 | 20 | 26 | 28 | 32 | 33 | 35 | 38 | 40 | 41 |
| Acetylene | 565 | 684 | | (¹) | (¹) | (¹) | 684 | 69 | 119 | 615 | 50 | 565 | | 565 |
| Ethylene ² | 37,075 | 40,287 | | 44,270 | 36,800 | 7,470 | 3,487 | 2,581 | 3,212 | 906 | 631 | 275 | | 275 |
| DMF | | | 37,400 | | | | 37,400 | | | 37,400 | | 37,400 | 37,384 | 1 |
| Total lbs./Hr. | 37,640 | 40,971 | 37,400 | 44,270 | 36,800 | 7,470 | 41,571 | 2,650 | 3,331 | 38,921 | 681 | 38,240 | 37,384 | 841 |
| G.p.m. @ 60° F. | | | 80 | | | 34 @ −20° F. | 80 | | | 79 | | 79 | 79 | |

¹ Acetylene content, 10 p.p.m. (max.).
² Ethylene purity (ex-acetylene) about 99.8%; 0.2% methane.

Herein and in the claims, the expression "mid-point of the absorber" is synonymous with "a point intermediate the ends of the absorber." Also "breakpoint" is synonymous with "inflection point" wherever used.

The inflection point will occur when employing a presaturated absorbent in the absence of any substantial refluxing condensed pure gas, or with reflux consisting of condensed pure gas in the absence of any substantial quantity of absorbent which is presaturated with the non-contaminant stream (in the example, ethylene). Use of both presaturation and reflux can produce a complementary effect although this is not essential to the successful operation of the invention. The use of substantial refluxing is now preferred because in the usual operation, reflux is introduced at the very top of the tower and this will aid in the scrubbing of any entrained solvent. Herein the terms "reflux" is applied to describe product removed from the top of the absorber 4 as a gas which then has been liquefied and is returned to said absorber top to cool the same.

Reasonable variation and modification are possible within the scope of the foregoing disclosure, the drawing, and the appended claims to the invention, the essence of which is that there have been provided a method and apparatus for the purification of gas or vapors by absorption, for example, the purification of ethylene to remove acetylene therefrom, the method comprising regulating the temperature and/or the amount of lean solvent and/or the reflux pure gas fed to the absorber or absorption zone responsive to change in position of the "break point" in the temperature gradient in the absorber as described herein; the apparatus comprising means for detecting said break point and means operatively connected to said first-mentioned means for regulating the temperature and flows as above set forth.

I claim:

1. A method for the purification of a gas to remove a contaminant component therefrom which comprises passing said gas upwardly into counter-current contact with downwardly flowing solvent effective to remove said contaminant from said gas, removing from the bottom of said absorption zone a solvent rich in said contaminant, removing from the top of said zone purified gas, condensing and returning a portion of said purified gas to said zone as a liquid at a point above the entry of said solvent, sensing change in the break point in the temperature gradient in said zone and controlling the rate of return of said liquid to the absorption zone responsive to said change of the breakpoint in said temperature in said zone.

2. A method for the purification of ethylene to remove acetylene therefrom which comprises flowing ethylene containing contaminant acetylene upwardly through an absorption zone in countercurrent contact with downwardly flowing solvent selective to remove acetylene from said ethylene, removing acetylene-rich solvent from the bottom of said zone, taking overhead purified ethylene and returning at least a portion of purified ethylene as a liquid to said absorption zone, sensing change in the level of the break point in the temperature gradient in said zone and regulating the amount of liquid returned to said zone responsive to said sensed change.

3. A method according to claim 2 wherein the solvent is dimethylformamide.

4. An apparatus for the purification of gas by absorption which comprises, in combination, an absorber, outlet means at the top of said absorber for removing purified gas therefrom, outlet means at the bottom of said absorber for removing contaminant rich solvent therefrom, inlet means for feeding solvent to the top of said absorber, inlet means for feeding purified gas as reflux to the top of said absorber, and means for sensing change in the temperature at the mid point of said absorber and means operatively connected with said means for sensing the temperature and said inlet means for feeding reflux to control the amount of reflux fed to said absorber.

5. A method for the purification of a gas by selective absorption with a solvent which comprises passing lean solvent and gas to be purified into countercurrent flow relationship in an absorption zone, removing from said zone a purified gas stream and rich solvent containing a contaminant, condensing and returning to said zone as a liquid coolant therefor purified gas recovered from said zone, presaturating said solvent with said purified gas, and regulating one of the amount of said liquid coolant, the temperature of the solvent, and the amount of solvent thus presaturated passed to said absorption zone responsive to the level of the break point in the temperature gradient in said zone.

6. A method for the purification of a gas to remove a contaminant component therefrom which comprises passing said gas upwardly into countercurrent contact with downwardly flowing solvent effective to remove said contaminant from said gas, removing from the bottom of said absorption zone a solvent rich in said contaminant, removing from the top of said zone purified gas, condensing and returning a portion of said purified gas to said zone as a liquid at a point above the entry of said solvent, sensing change in the break point in the temperature gradient in said zone and controlling the rate of return of said liquid and the rate of flow of said solvent to the absorption zone responsive to said change in said temperature.

7. A method for the purification of ethylene to remove acetylene therefrom which comprises flowing ethylene containing contaminant acetylene upwardly through an absorption zone in countercurrent contact with downwardly flowing solvent selective to remove acetylene from said ethylene, removing acetylene-rich solvent from the bottom of said zone, taking overhead purified ethylene and returning at least a portion of purified ethylene as a liquid to said absorption zone, sensing change in the level of the break point in the temperature gradient in said zone and regulating the amount of liquid returned to said zone and the rate of flow of said solvent responsive to said sensed change.

8. A method for the purification of ethylene to remove acetylene therefrom which comprises flowing ethylene containing contaminant acetylene upwardly through an absorption zone in countercurrent contact with downwardly flowing solvent selective to remove acetylene from said ethylene, removing acetylene-rich solvent from the bottom of said zone, taking overhead purified ethylene and returning at least a portion of purified ethylene as a liquid to said absorption zone, sensing change in the level of the break point in the temperature gradient in said zone and regulating the amount of liquid returned to said zone and the rate of flow and the temperature of said solvent responsive to said sensed change.

References Cited in the file of this patent

UNITED STATES PATENTS

| | | |
|---|---|---|
| 2,479,867 | Rosebaugh | Aug. 23, 1949 |
| 2,519,874 | Berg | Aug. 22, 1950 |
| 2,630,876 | Kehde | Mar. 10, 1953 |
| 2,661,812 | Gilmore | Dec. 8, 1953 |
| 2,771,149 | Miller et al. | Nov. 20, 1956 |
| 2,907,409 | Koble | Oct. 6, 1959 |